United States Patent
Jones

(10) Patent No.: US 10,834,470 B2
(45) Date of Patent: Nov. 10, 2020

(54) PROCESSING MEDIA CONTENT WITH SCENE CHANGES

(71) Applicant: TELEFONAKTIEBOLAGET LM ERICSSON (PUBL), Stockholm (SE)

(72) Inventor: Anthony Richard Jones, Southhampton (GB)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 505 days.

(21) Appl. No.: 15/111,706

(22) PCT Filed: Jan. 17, 2014

(86) PCT No.: PCT/EP2014/050960
§ 371 (c)(1),
(2) Date: Jul. 14, 2016

(87) PCT Pub. No.: WO2015/106825
PCT Pub. Date: Jul. 23, 2015

(65) Prior Publication Data
US 2016/0337705 A1    Nov. 17, 2016

(51) Int. Cl.
*H04N 21/61* (2011.01)
*H04N 21/845* (2011.01)
(Continued)

(52) U.S. Cl.
CPC ..... *H04N 21/6125* (2013.01); *G06K 9/00765* (2013.01); *G11B 27/10* (2013.01);
(Continued)

(58) Field of Classification Search
CPC .......... H04N 21/6125; H04N 21/8456; H04N 21/6379; H04N 21/234381; H04N 21/23418; G11B 27/10; G06K 9/00765
See application file for complete search history.

(56) References Cited

U.S. PATENT DOCUMENTS

| | | | |
|---|---|---|---|
| 6,342,904 B1 * | 1/2002 | Vasudevan | H04N 19/587 375/E7.253 |
| 2002/0061136 A1 * | 5/2002 | Shibata | G06F 16/785 382/199 |

(Continued)

OTHER PUBLICATIONS

Velibor Adzic et al., "Optimizing video encoding for adaptive streaming over HTTP", May 1, 2012 (May 1, 2012), IEEE Transactions on Consumer Electronics, vol. 58, No. 2, pp. 397-403. (Year: 2012).*

(Continued)

*Primary Examiner* — Shawn S An
(74) *Attorney, Agent, or Firm* — Rothwell, Figg, Ernst & Manbeck, P.C.

(57) ABSTRACT

Media content comprises video. The video comprises a sequence of scenes comprising pictures. The media content comprises segments. A method determines when a scene change between a first scene and a second, subsequent, scene occurs within a predetermined proximity to a boundary between segments. When a scene change occurs within a predetermined proximity of an end of a segment, at least a first picture in the second scene is discarded and an additional picture is inserted in the first scene. When a scene change occurs within a predetermined proximity of a start of a segment, at least one picture in the first scene is discarded and an additional picture is inserted in the second scene. The additional picture can be a repeat or a copy of an existing picture, or it can be based on at least one existing picture in the first scene, such as by interpolation.

15 Claims, 12 Drawing Sheets

(51) Int. Cl.
- *H04N 19/107* (2014.01)
- *H04N 21/2343* (2011.01)
- *H04N 19/114* (2014.01)
- *H04N 19/142* (2014.01)
- *H04N 19/172* (2014.01)
- *G06K 9/00* (2006.01)
- *G11B 27/10* (2006.01)
- *H04N 21/234* (2011.01)
- *H04N 21/6379* (2011.01)

(52) U.S. Cl.
CPC ......... *H04N 19/107* (2014.11); *H04N 19/114* (2014.11); *H04N 19/142* (2014.11); *H04N 19/172* (2014.11); *H04N 21/23418* (2013.01); *H04N 21/23439* (2013.01); *H04N 21/234381* (2013.01); *H04N 21/6379* (2013.01); *H04N 21/8456* (2013.01)

(56) References Cited

U.S. PATENT DOCUMENTS

| | | | | |
|---|---|---|---|---|
| 2002/0136305 | A1* | 9/2002 | Kim | H04N 5/144 375/240.17 |
| 2005/0182503 | A1* | 8/2005 | Lin | G11B 27/031 700/94 |
| 2011/0069757 | A1* | 3/2011 | Ammu | H04N 19/172 375/240.12 |
| 2012/0287987 | A1* | 11/2012 | Budagavi | H04N 19/587 375/240.02 |
| 2014/0133548 | A1* | 5/2014 | Mate | H04N 9/8205 375/240.02 |

OTHER PUBLICATIONS

International Search Report dated Sep. 24, 2014, in International Application No. PCT/EP2014/050960, 4 pages.

Velibor Adzic et al. "Optimizing video encoding for adaptive streaming over HTTP", IEEE Transactions on Consumer Electronics, vol. 58, No. 2, May 1, 2012 (May 1, 2012), pp. 397-403, XP055139593, ISSN: 0098-3063, DOI: 10.1109/TCE.2012.6227439.

Jan Lievens et al. "Optimized segmentation of H.264/AVC video for HTTP adaptive streaming", Integrated Network Management (IM 2013), 2013 IFIP/IEEE International Symposium on, IEEE, May 27, 2013 (May 27, 2013), pp. 1312-1317, XP032445823, ISBN: 978-1-4673-5229-1.

Cablelabs "Encoder Boundary Point Specification—OC-SP-EBP-I01-130118", OpenCable(TM) Specifications, Jan. 18, 2013 (Jan. 18, 2013), XP055138397, Retrieved from the Internet: URL:http://www.cablelabs.com/wp-content/uploads/specdocs/OC-SP-EBP-I01-130118.pdf [retrieved on Sep. 5, 2014] cited in the application, 31 pages.

* cited by examiner

PROCESSING MEDIA CONTENT WITH SCENE CHANGES

CROSS REFERENCE TO RELATED APPLICATION(S)

This application is a 35 U.S.C. § 371 National Phase Entry Application from PCT/EP2014/050960, filed Jan. 17, 2014, designating the United States, the disclosure of which is incorporated herein in its entirety by reference.

TECHNICAL FIELD

This invention relates to processing media content which comprises video.

BACKGROUND

There is an increasing demand to deliver media content to devices over a network. Adaptive Bit Rate (ABR) is one delivery technique. Source content (e.g. audio, video) is encoded at a number of different bit rates. Encoded content is formed into segments. When a device requests content, the content is streamed from a server to the device by sending encoded media segments. During the delivery, the server can select between segments encoded at a higher bit rate or segments encoded at a lower bit rate. In this way, the server can vary the amount of data sent to a device. This allows the delivery to cope with network congestion, and reduce buffering at a device. For example, during a period of congestion (e.g. in the delivery network, or at the client device), the server may send segments encoded at a lower bit rate. ABR can also help to cope with different device and network capabilities.

Video content includes scene changes, when there is a significant change to the content, such as a cut between cameras or an edit between recorded video content. When compressing video sequences a scene change often requires the use of intra-coded pictures as there is no previously coded picture from which to predict. The scene change typically results in the need for a picture that requires a large number of bits. When a scene change occurs at or near the end of a segment, compression of the picture(s) at the end of the segment can lead to difficulties managing the rates to ensure picture quality is maintained, whilst retaining a constant duration of a segment. It can, for example, result in a segment containing more bits than anticipated, or can cause other pictures in the segment to be coded with a higher quantisation, resulting in reduced picture quality.

Some delivery schemes allow for some variation to the length of segments. However, this is undesirable as it increases the complexity of the delivery scheme.

SUMMARY

An aspect of the invention provides a method of processing media content comprising video. The video comprises a sequence of scenes comprising pictures. The media content comprises segments. The method comprises determining when a scene change between a first scene and a second, subsequent, scene occurs within a predetermined proximity to a boundary between segments. The method further comprises, when a scene change occurs within a predetermined proximity of an end of a segment, discarding at least a first picture in the second scene and inserting an additional picture in the first scene. Additionally, or alternatively, the method can comprise, when a scene change occurs within a predetermined proximity of a start of a segment, discarding at least one picture in the first scene and inserting an additional picture in the second scene.

Although the media content comprises segments, the content does not have to be divided into separate segments at the point where the processing occurs. For example, the content may comprise some form of indicator indicative of a boundary where a segment starts/ends. One type of indicator is a Boundary Point. The Boundary Point can be used to divide the content into separate segments, and this segmentation can occur at a part of the distribution network which is downstream of where the processing occurs.

When a scene change occurs within a predetermined proximity of an end of a segment, the step of inserting an additional picture can comprise repeating an existing picture in the first scene.

When a scene change occurs within a predetermined proximity of an end of a segment, the step of inserting an additional picture can comprise generating a new picture based on at least one existing picture in the first scene.

The first scene can comprise a pair of interlaced fields comprising a first interlaced field and a second interlaced field. The step of inserting an additional picture can comprise inserting an additional pair of interlaced fields comprising an additional first interlaced field and an additional second interlaced field, wherein the additional first interlaced field is interpolated based on the first interlaced field and the second interlaced field in the first scene and the second additional interlaced field is a repeat of the second interlaced field.

When a scene change occurs within a predetermined proximity of a start of a segment, the step of inserting an additional picture can comprise copying an existing picture in the second scene.

When a scene change occurs within a predetermined proximity of a start of a segment, the step of inserting an additional picture can comprise generating a new picture based on at least one existing picture in the second scene.

The second scene can comprise a pair of interlaced fields comprising a first interlaced field and a second interlaced field. The step of inserting an additional picture can comprise inserting an additional pair of interlaced fields comprising an additional first interlaced field and an additional second interlaced field, wherein the additional first interlaced field is a repeat of the first interlaced field and the second additional interlaced field is interpolated based on the first interlaced field and the second interlaced field in the second scene.

The segments can have the same duration.

The method can further comprise forming the media content into segments of a fixed duration.

The segments can be adaptive bit rate segments.

The method can further comprise encoding, or transcoding, the media content at a plurality of different bit rates to form a plurality of different bit rate representations of the media content.

Another aspect of the invention provides apparatus comprising a processor and a memory, the memory containing instructions executable by said processor. The apparatus is operative to determine when a scene change between a first scene and a second, subsequent, scene occurs within a predetermined proximity to a boundary between segments. The apparatus is operative to, when a scene change occurs within a predetermined proximity of an end of a segment, discard at least a first picture in the second scene and inserting an additional picture in the first scene. Additionally, or alternatively, the apparatus is operative to, when a scene change occurs within a predetermined proximity of a start of a segment, discard at least one picture in the first scene and inserting an additional picture in the second scene.

The apparatus can be arranged to perform any other features of the described or claimed method.

An advantage of at least one embodiment is to help preserve a particular segment duration and/or bit budget per segment with minimal visible impairment to the content. For example, it can avoid the need for a large number of bits to encode a picture when a scene change occurs close to a boundary between segments. This can help reduce the need for harsh quantisation of the content. The visibility of the additional picture, or pictures, is masked by the proximity to the scene cut and therefore is relatively unintrusive. The additional picture can be generated, for example, by a simple repeat/copy of an existing picture, or can be predicted from other pictures, and therefore does not require a large number of bits at the end of a segment.

The term "picture" is a collective term for a field or a frame, as per ISO/IEC 14496-10.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
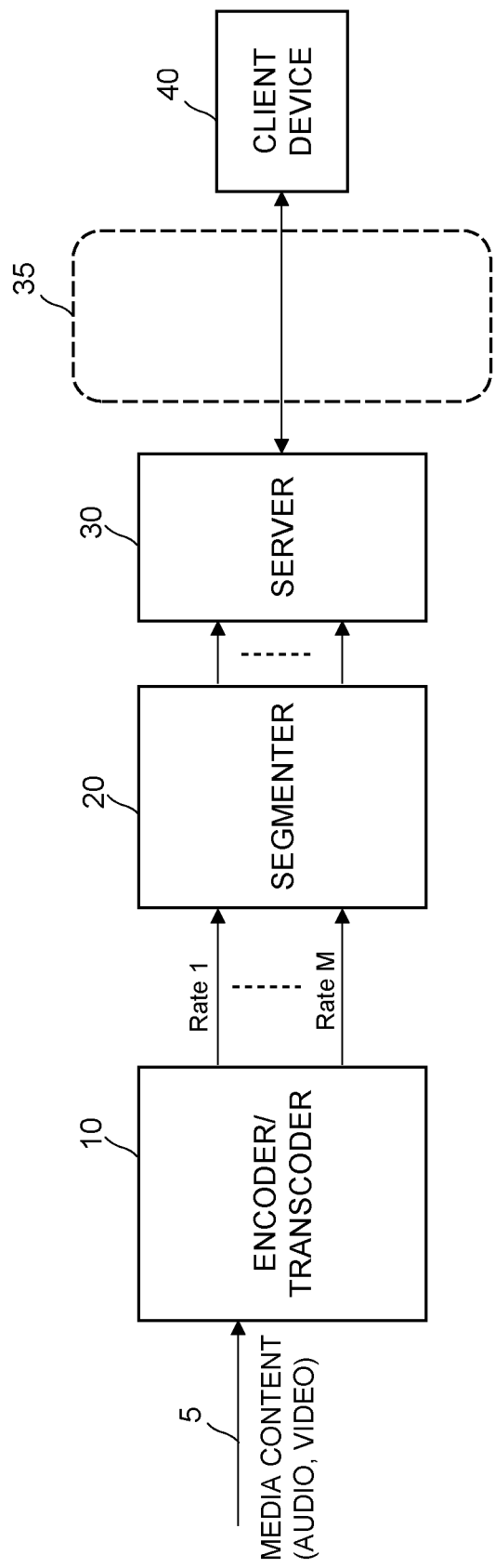
FIG. 1 shows a system for delivering media content to devices.

FIG. 1 shows a system for delivering media content to devices. Media content is received at an input 5 of an encoder/transcoder 10. The content may be received in baseband format, or in coded format. If the content is already coded, transcoder 10 transcodes the content to the required output format. The media content can comprise video content, such as a live video feed or stored content.

The encoder/transcoder 10 encodes the media content into a plurality of different bit rate representations of the content. There can be two representations, or a larger number of representations. Each representation differs in bit rate. For example, there can be bit rate representations at 2 Mbit/s, 4 Mbit/s, 6 Mbit/s, or any other bit rate values. One or more other properties of the content can vary among the representations, such as video resolution, frame rate. Audio rates (or number of audio channels) can also vary between representations.

The representations are also formed into segments. Segments can have a relatively short duration, such as 2 seconds. Segmentation is performed in a manner such that the content in the different bit rate representations is aligned. For example, segment #10 in bit rate representation 1 is the same portion of content as segment #10 in bit rate representation 2. This allows a serving device to switch cleanly between representations during delivery of the content, without disrupting the content. Boundary points between segments can be marked by the encoder/transcoder 10. For example, a header of a packet carrying the encoded content can indicate a boundary point. An example of signalling boundary points is provided in OpenCable Encoder Boundary Point Specification OC-SP-EBP-I01-130118 available at: http://www.cablelabs.com/specification/encoder-boundary-point-specification/.

FIG. 1 shows a segmenter 20, which divides the encoded content into individual segments. The segmenter 20 can be located with the encoder/transcoder 10, or it can be located at a different part of the delivery network. Segments of media content are stored at a server 30. A network 35 connects the server 30 to devices 40. The network can be a wide area network, a local area network, an access network such as a broadband access network, or any combination of these. Devices 40 can include, for example, computers, tablets, mobile phones (smart phones), set top boxes, digital video recorders, internet-equipped televisions.

When a device 40 requests content, the server 30 delivers the requested content as a stream of segments over network 35. The delivery can be performed as a file transfer, such as using Hypertext Transfer Protocol (HTTP) or File Transfer Protocol (FTP). The file transfer can use a unicast or a multicast delivery mechanism.

During the delivery, the server 30 can select between segments encoded at a higher bit rate or segments encoded at a lower bit rate. In this way, the server 30 can vary the amount of data sent to the device 40. This allows the delivery to cope with network congestion, and reduce buffering at the device 40. For example, during a period of congestion (e.g. in the delivery network 35, or at the client device 40), the server 30 may send segments encoded at a lower bit rate. This system is generally known as Adaptive Bit Rate (ABR). Forms of ABR are being standardised. Relevant references include: ISO/IEC 23009-1, Information technology—Dynamic adaptive streaming over HTTP (DASH) and HTTP Live Streaming, described in an Internet Engineering Taskforce (IETF) Informational Internet-Draft: draft-pantos-http-live-streaming-12, available at http://tools.ietforg/html/draft-pantos-http-live-streaming-12.

Several syntaxes exist for a server 30 to signal, to a device 40, an available set of representations and segments in a sequence.

Figure 2:
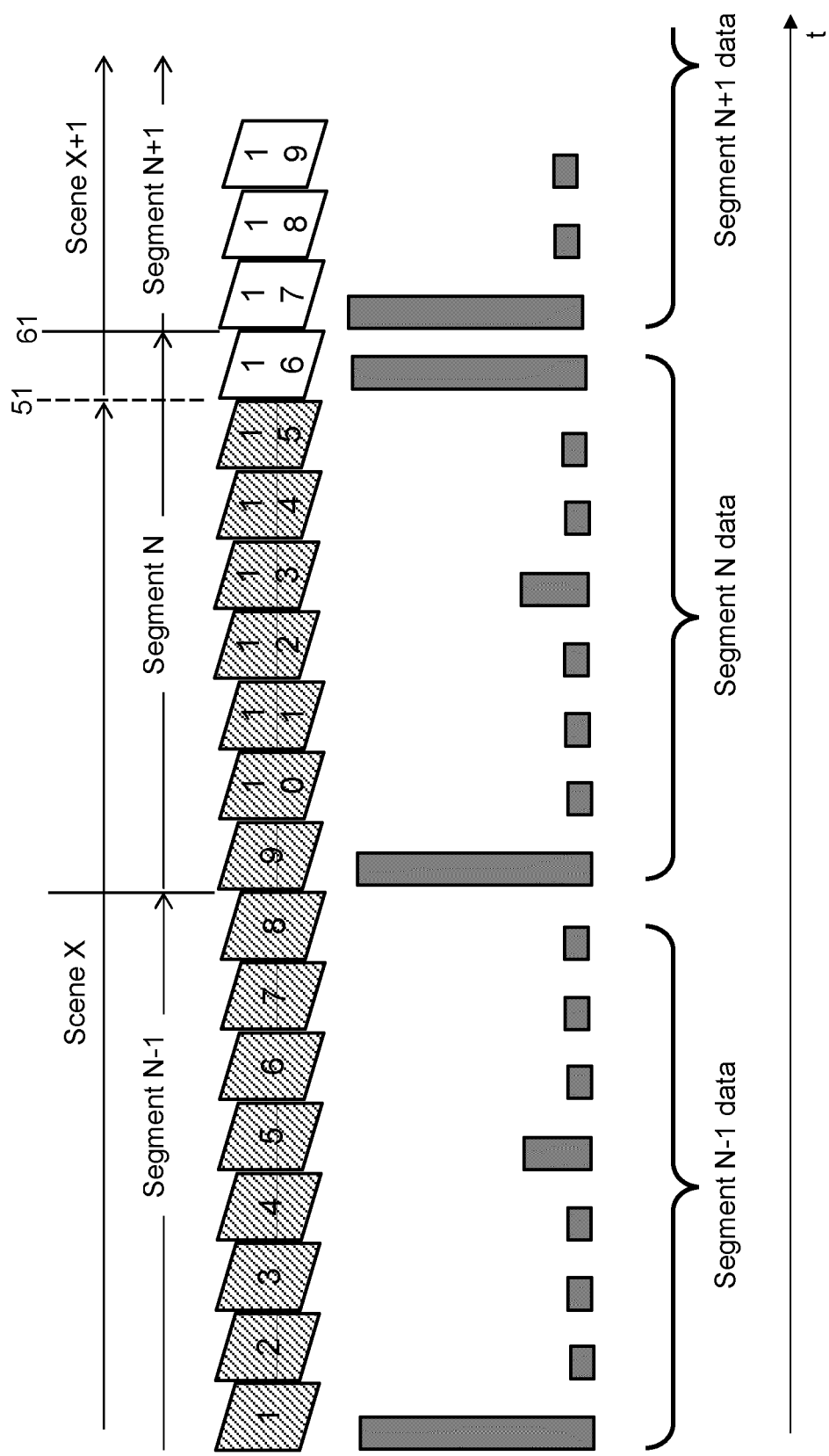
FIG. 2 shows a first example of media content where a scene change occurs close to (and before) a segment boundary.
Figure 3:
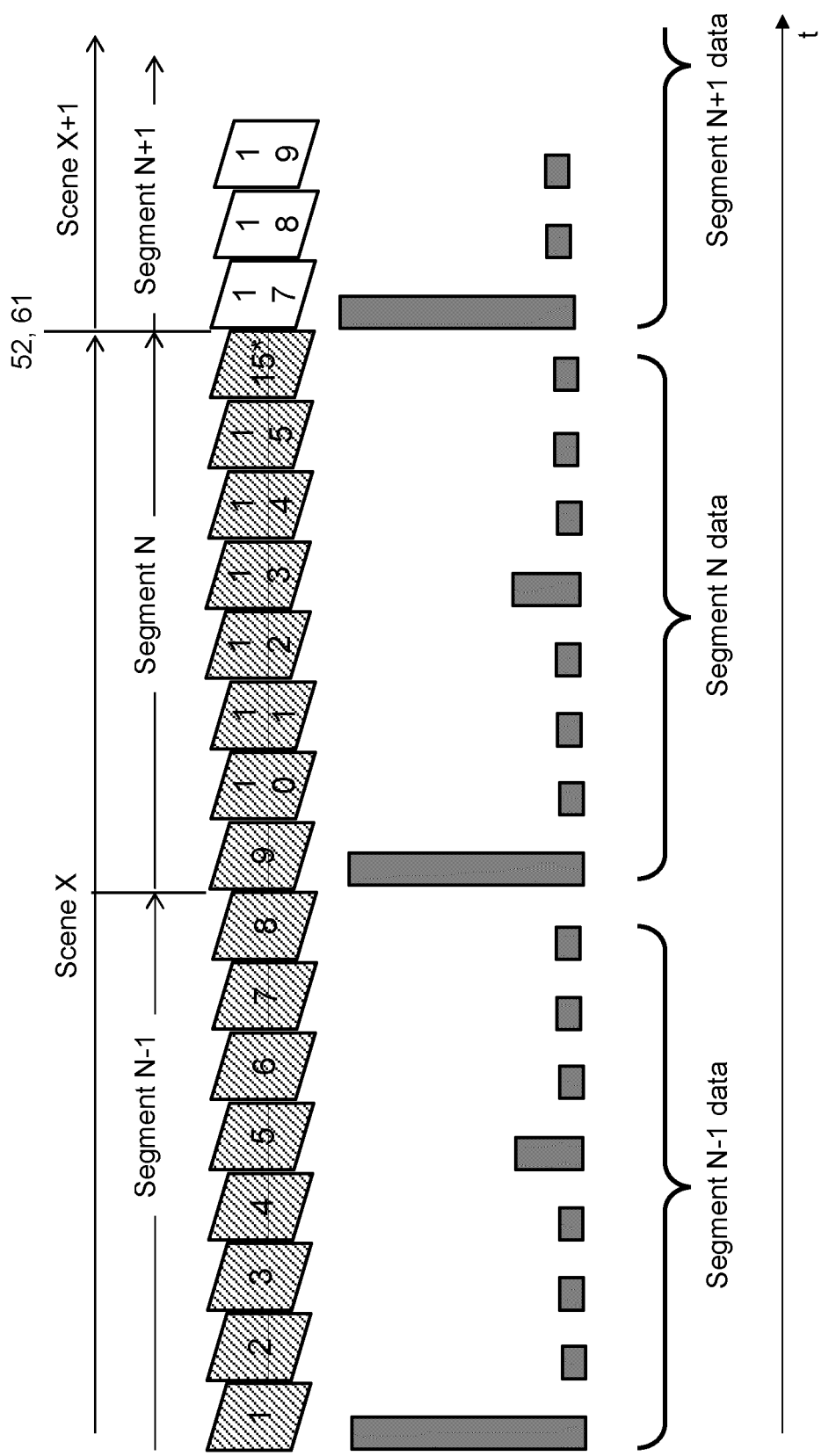
FIG. 3 shows the content of the first example after processing.

FIGS. 2 and 3 show a first example of processing media content. FIG. 2 shows a time line of content without processing, and FIG. 3 shows a time line after processing.

Video content comprises a sequence of pictures. An example sequence of pictures 1-19 is shown. In video content, scene changes occur at various points in time. For example, a scene change may be due to an edit in the source video content or a cut between inputs from different cameras used to create the source video. In FIG. 2 a scene change occurs at point 51, between pictures 15 and 16. Picture 15 is the last picture of a first scene X. Picture 16 is the first picture of a second scene X+1. The second scene X+1 occurs after the first scene X.

The lower line of FIGS. 2 and 3 represents (schematically) an amount of data required to code each picture 1-19. Video compression typically forms a Group of Pictures (GOP) which comprises a sequence of complete and contiguous video pictures. The Group of Pictures (GOP) begins with a picture selected to be a master picture, denoted as an "I" or Intra coded picture for that sequence. This I picture is coded without reference to any other picture in the sequence and exploits only spatial redundancy within the I picture. Since I pictures may be decoded without reference to picture information in any other picture, I pictures can be relied upon as a starting point for a decoder. The other pictures in a Group of Pictures (GOP) can be coded very efficiently by exploiting temporal redundancy in the image sequence. These pictures are coded so that information is transmitted describing differences between the current picture and already coded reference pictures temporally adjacent to it. Such pictures are of two types: one type is a Predicted or P picture type, which is predicted and coded only from one direction of the image sequence, for example from earlier pictures in the image sequence. The other type is a Bidirectional or B picture type, which are predicted from both forward and backward directions of the sequence, for example by interpolation from earlier and later pictures in the video sequence.

Compression algorithms can achieve a reduction in bit rate because the P and B pictures use smaller amounts of data to encode the picture than an I picture and are more numerous in a Group of Pictures (GOP). An I picture uses more data to encode the picture and so these are relatively sparse in a Group of Pictures (GOP). The I picture is useful when streams are interrupted or suffer occasional errors because it resets the decoder with an independent picture. A Group of Pictures (GOP) can be structured as a sequence of I, P and B pictures in an arbitrary pattern e.g. IBBPBBP . . . until the next I picture is inserted.

The aim of the encoder 10 is to produce a (near) constant bit rate. While there will be some minor variation, there is typically a target number of bits per segment. The complexity of the content will affect the quantisation used to code the content to the target bit budget. When a scene change occurs in the video content there is a significant change to the image content. This will require a new I picture for the new scene. This is expensive in terms of the number of bits available to code a segment. A large number of I pictures requires coarser quantisation (reduced resolution) when encoding the segment, in order to meet the overall bit budget to code a segment.

A scene change can be detected in various ways, such as by detecting a significant difference between adjacent pictures (e.g. motion vector consistency). A combination of metrics can e used to reliably detect a scene change. Metadata accompanying the video content may indicate when a scene change occurs.

As described above, the media content is formed into segments. In an embodiment, the segments are of equal duration. For example, segments can be 2 seconds in duration. Segments N−1, N, and N+1 are shown. The number of pictures in a segment is reduced for clarity. Point 61 shows a boundary between an end of segment N and a start of segment N+1. The first picture of a segment is typically encoded as an I picture. In this example, a scene change 51 occurs one picture before a boundary 61 between segments. The final picture of scene X is picture 15. The final picture of segment N is picture 16. Picture 16 is a first picture in scene X+1 and requires a larger amount of data to encode. In this example there are two consecutive I pictures: a first I picture due to the first picture in scene X+1 and a second I picture due to the first picture in a new segment. This is inefficient in terms of data as pictures 16 and 17 are consecutive pictures in the same scene and do not both need to be coded as I pictures.

In embodiments, the processing of content can vary based on the proximity of a scene change to a boundary between an end of a segment/a start of a segment. FIG. 3 shows the sequence of pictures after being processed according to an embodiment. In this example, if a scene change occurs one picture before an end of a segment, the scenes are modified. Picture 16 of scene X+1 is discarded. Picture 16 of scene X+1 is replaced by a picture 15\*, which can be identical to the last picture (picture 15) in scene X. This causes the position of the scene change to be modified. The new position 52 of the scene change is aligned with the boundary 61 between segments. Stated another way, the scene change is delayed. By comparing the lower lines of FIGS. 2 and 3 the large amount of data required to code picture 16 is avoided. The duplicated picture 15 can be encoded much more efficiently. The length of segment N remains the same. This ensures compatibility with systems that rely on consistent segment durations.

Figure 4:
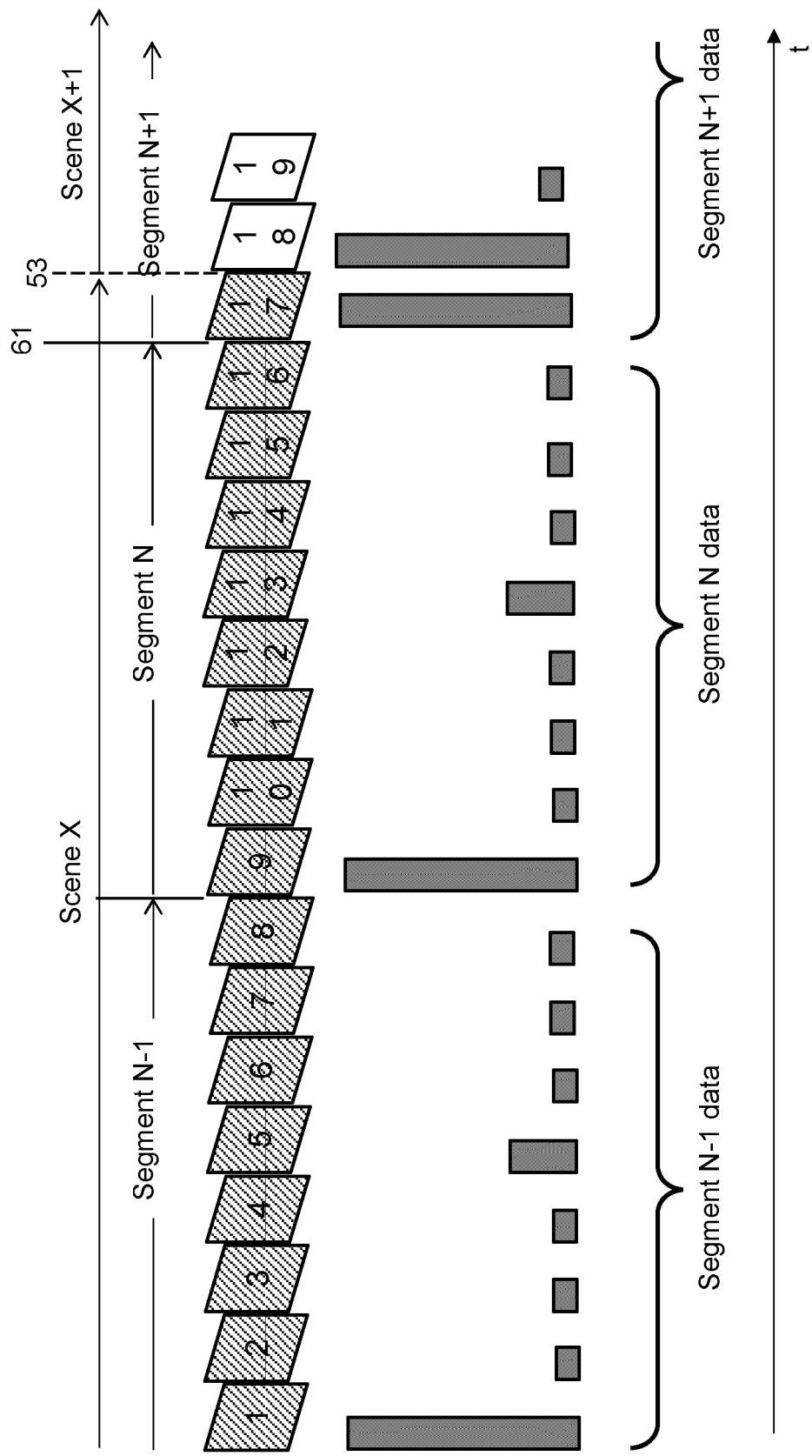
FIG. 4 shows a second example of media content where a scene change occurs close to (and after) a segment boundary.
Figure 5:
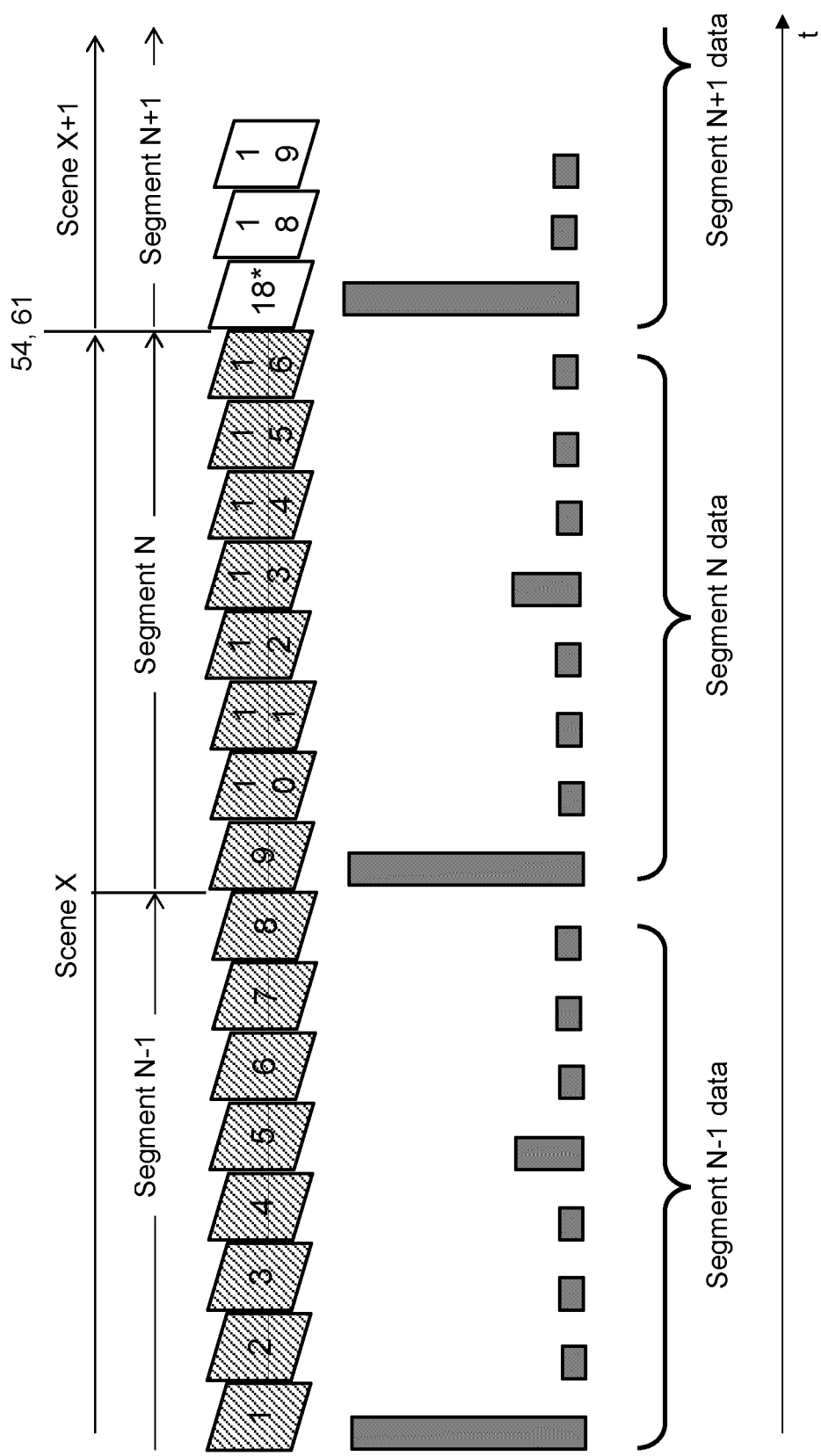
FIG. 5 shows the content of the second example after processing.

FIGS. 4 and 5 show an example where a scene change occurs after the start of a segment, and close to the start of the segment. In FIG. 4 a scene change occurs at point 53, between pictures 17 and 18. Picture 17 is the last picture of a first scene X. Picture 18 is the first picture of a second scene X+1. The second scene X+1 occurs after the first scene X. The lower line of FIGS. 4 and 5 represents (schematically) an amount of data required to code each picture 1-19. In this example, the scene change 53 occurs one picture after a boundary 61 between segments N and N+1. The final picture of scene X is picture 17. Picture 17 is also a first picture in segment N+1 and therefore is coded as an I picture. Picture 18 is a first picture in scene X+1 and requires a larger amount of data to encode. Therefore, in this example there are two consecutive I pictures: a first I picture due to the first picture in segment N+1 and a second I picture due to the first picture in a new scene X+1. This is inefficient in terms of data, as the first two pictures of segment X+1 are both encoded as I pictures.

FIG. 5 shows the sequence of pictures after being processed according to an embodiment. In this example, if a scene change occurs one picture after a start of a segment, the scenes are modified. Picture 17 of scene X is discarded. Picture 17 of scene X is replaced by a picture 18*. Picture 18* can be identical to (i.e. a copy of) the first picture in scene X+1. In summary, picture 18* can be the same as picture 18. This causes the position of the scene change 53 to be modified. The new position 54 of the scene change is aligned with the boundary 61 between segments. The scene change is advanced. The lower line of FIG. 5 shows that the large amount of data required to code picture 17 is avoided. The duplicated picture 18 can be encoded much more efficiently. The length of segment N remains the same. This ensures compatibility with systems that rely on consistent segment durations.

In FIGS. 3 and 5 the new picture (picture 15* in FIG. 3, picture 18* in FIG. 5) can be the same as another existing picture, a repeated picture or a copy picture. This is the simplest option for the new picture, requiring least complexity in coding and transmitted data. Another option is to generate the new picture using a technique such as prediction, based on another picture (or multiple other pictures) of the scene. For example, picture 15* shown in FIG. 3 can be generated based on picture 15, or picture 15 together with one or more pictures preceding picture 15. Similarly, picture 18* shown in FIG. 5 can be generated based on picture 18, or picture 18 together with one or more pictures following picture 18. This can help to make the new picture appear more natural by avoiding obvious motion stall.

FIGS. 2 to 5 show examples where a scene change occurs a distance of one picture from a boundary between segments. The method can be applied to a scene change occurring a larger distance from an end/start of a segment. For example, 2, 3 or more pictures. Larger distances will risk incurring some visible disturbance to the content. One option is to vary the proximity threshold depending on a factor such as bit rate/quality. Lower bit rate/lower quality services may tolerate more intrusive processing in order to reduce the bit rate. As an example, the threshold proximity of a scene change to a segment boundary may be set at a value of one picture for a high bit rate/high quality service, and the threshold may be increased to a higher number of pictures for a lower bit rate/lower quality service.

The principle described here makes use of the human visual system psycho-visually masking the repeated picture because of the scene change occurring close to the repeat. The repeat is visually more acceptable than heavy quantisation of a picture that can occur in prior art schemes caused by the need to encode a full intra-picture.

The method described here for processing content when a scene change occurs close to a boundary between segments can be used selectively. For example, under certain conditions a decision may be taken not to process content in this new way, even though a scene change occurs close to a boundary between segments. Another option is to determine a number of bits required to encode the picture(s) at the beginning/end of the segment that the method would discard. If the number of bits is less than a particular threshold value, the method can retain the pictures. The threshold value could be fixed or variable, e.g. depending on the number of bits already used in the segment.

Content can be non-interlaced (i.e. progressive scan) or interlaced. An interlaced frame comprises a pair of interlaced fields. One of the pair of fields contains image content for odd numbered lines and the other of the pair of fields contains image content for even numbered lines. It has been described above how the new picture can be the same as an existing picture; e.g. picture 15* in FIG. 3 is a repeat of picture 15, picture 18* is a copy of the following picture 18. Repeating/copying a whole interlaced frame may not be desirable if there is motion, as the first field of the repeated frame comprises content which occurred temporally before the second field. Repeating the whole interlaced frame may give the appearance that motion has reversed, which can be visible and distracting to a viewer. One approach to interlaced content will now be described.

Figure 6:
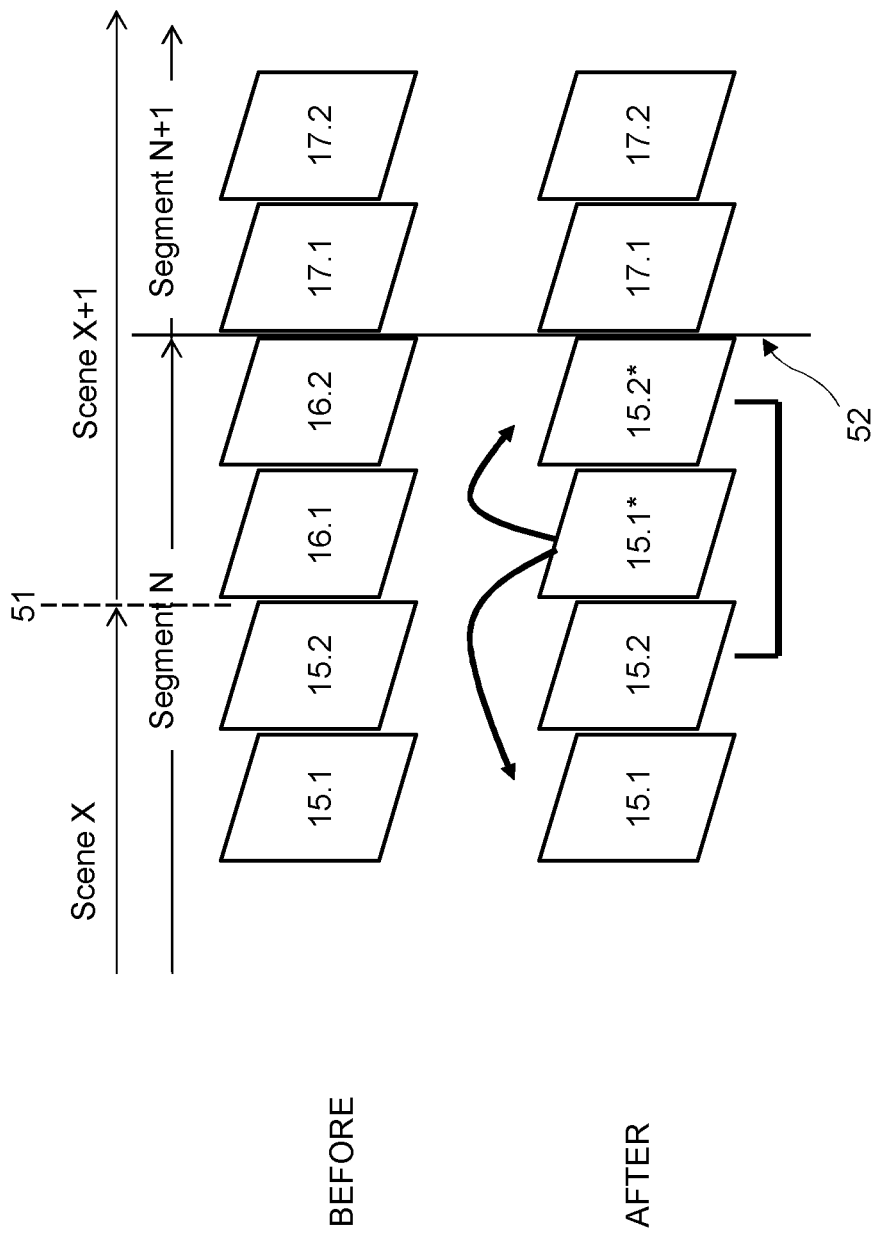
FIG. 6 shows a first example of interlaced content where a scene change occurs close to (and before) a segment boundary and the same content after processing.

FIG. 6 shows an example corresponding to that of FIG. 2 where a scene change occurs before an end of a segment. The scene change occurs at point 51 between a scene X and a scene X+1. The original sequence is shown, together with a modified sequence after processing. In FIG. 6, a first interlaced field is represented as xx.1 and a second interlaced field is represented as xx.2. The original sequence is: 15.1, 15.2, 16.1, 16.2. The modified sequence is:
15.1
15.2
15.1* a new first field created by interpolation
15.2* a repeat of 15.2
17.1
17.2, etc.

The new second interlaced field (15.2*) is a repeat of the second interlaced field (15.2). The new first interlaced field (15.1*) is generated by spatial interpolation, such as by interpolating between 15.1 and 15.2. Effectively, there is a freeze-field rather than a freeze-frame.

Figure 7:
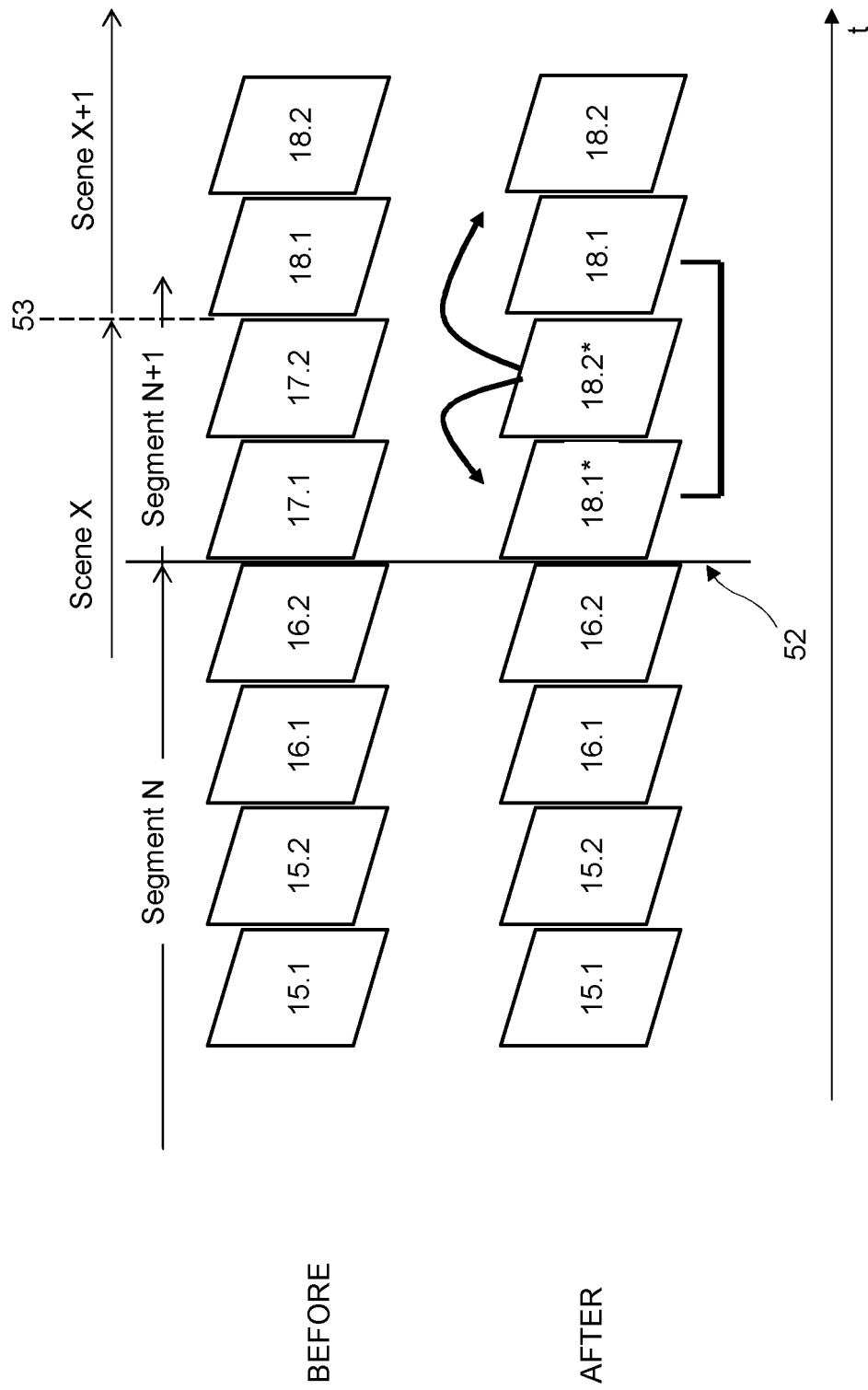
FIG. 7 shows a second example of interlaced content where a scene change occurs close to (and after) a segment boundary and the same content after processing.

FIG. 7 shows an example corresponding to that of FIG. 4 where a scene change occurs at a start of a segment. The scene change occurs at point 53 between a scene X and a scene X+1. The original sequence is shown, together with a modified sequence after processing. The original sequence is: 17.1, 17.2, 18.1, 18.2. The modified sequence is:
18.1* early display of the first field 18.1
18.2* a new second field created by interpolation
18.1 the original field 18.1, in the original temporal position
18.2 the original field 18.2, in the original temporal position
19.1, etc.

The new first interlaced field (18.1*) is a copy of the first interlaced field (18.1). The new second interlaced field (18.2*) is generated by spatial interpolation, such as by interpolating between 18.1 (=18.1*) and 18.2. There is a freeze field of the first field (18.1).

For progressive scan content, field manipulation is not required. Content which is coded as interlaced but in fact has progressive content inside it (e.g. movie content), then it is preferable to repeat both fields, rather than just one field. Referring again to FIG. 6, both of the new fields (15.1*, 15.2*) could be repeats of the previous fields. Similarly, both 18.1* and 18.2* could be repeats of the existing fields 18.1, 18.2.

The media content can comprise video and audio. Advantageously, while the video can be manipulated as described above, the audio can remain unchanged.

The methods described above can be performed at various places in the processing/delivery chain of the content. One option is to perform the processing at baseband, i.e. manipulating the picture data before the pictures are encoded (compressed). Data for an existing picture of a scene is deleted, and data for an additional picture is added. Data for an additional picture can be added by replicating data of an existing picture or by interpolating data for the additional picture from existing pictures. The modified sequence of pictures is applied to an encoder. Another option is to perform scene change detection at baseband, before the encoder, but to perform manipulation of the pictures at the output of the encoder. This may use pre-coded bit streams representing pictures which are to be replicated and can switch between encoded data representing a picture to be removed and the pre-coded data representing pictures to be replaced. In this case, the pre-coded bit streams represent efficiently coded replacement pictures. Referring again to the example of FIG. 2, the method may form:

(i) an encoded version of picture 16; and
(ii) a coded picture that equates to "predict from picture 15 with no changes".

At the encoder, a decision is taken to either use (i) or (ii) and to output that into the encoded bitstream. This option is easiest to implement when processing for a scene change before the end of a segment.

The encoding can be any kind of compression encoding, such as H.264/MPEG-4 Part 10 AVC (Advanced Video Coding).

Figure 8:
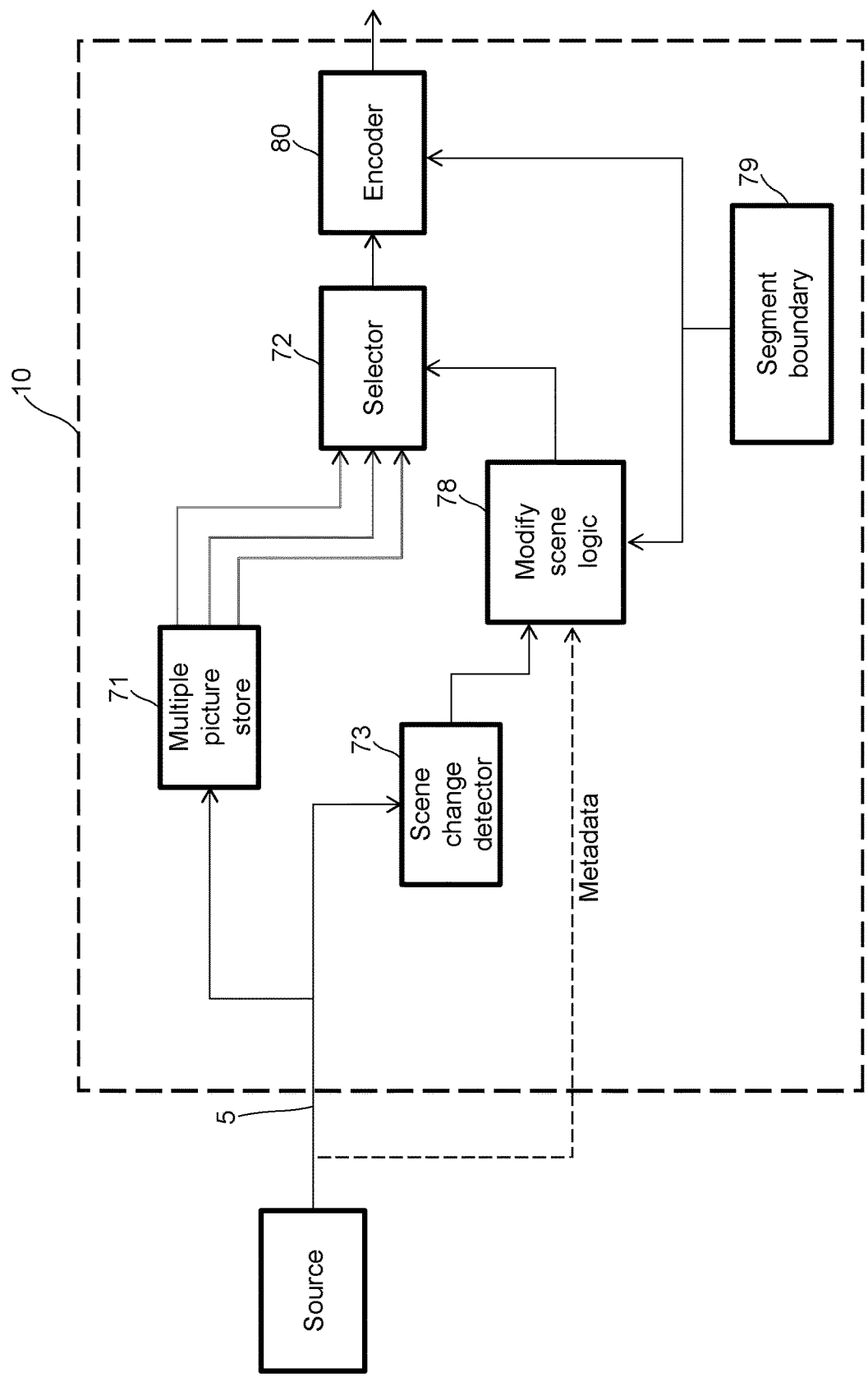
FIG. 8 schematically shows an example of apparatus for implementing the processing.

FIG. 8 schematically shows an example of processing apparatus for implementing the processing described above. The apparatus can be incorporated in the encoder/transcoder 10 of FIG. 1, or can be located before the encoder 10. FIG. 8 and earlier drawings do not show picture re-ordering, to improve the clarity of the explanation. Picture re-ordering is a known function of compression encoders, to re-order pictures such that any reference pictures are delivered before the predicted pictures that require those reference pictures for computation.

Content is received via an input 5. A multiple picture store 71 is connected to the input 5. For example, the store can be a delay line which is capable of storing a number of pictures in sequence. A scene change detector 73 is also connected to the input 5. The scene change detector 73 detects when a scene change occurs in the video content. Additionally, or alternatively, metadata received from the source via the input 5 can indicate when scene changes occur, and can supplement or avoid the need to detect scene changes 73. A signalled splice point is an example of such metadata. A segment boundary block 79 signals when a segment boundary should occur, i.e. when a current segment should end and when the next segment should begin. Modify scene logic 78 receives inputs from the scene change detector 73 and segment boundary block 79. The modify scene logic 78 monitors the proximity of a scene change to an end/start of segment, using the inputs, and decides when a scene should be modified in the manner that has previously been described. Modify scene logic 78 provides an output to a selector 72 to select data from the store 71. In a case where logic 78 determines that a picture should be replicated, data for a particular picture stored in the store 71 is output to the encoder 80 in place of another picture stored in the store 71. The multiple picture store 71 may also comprise an interpolation function to allow first or second field interlaced pictures to be interpolated as needed to allow field freezes to be used. The choice of field or frame freeze can be dependent on whether the source is determined to be field or frame based content. Encoder 80 performs compression encoding of the video content received from selector 72.

Figure 9:
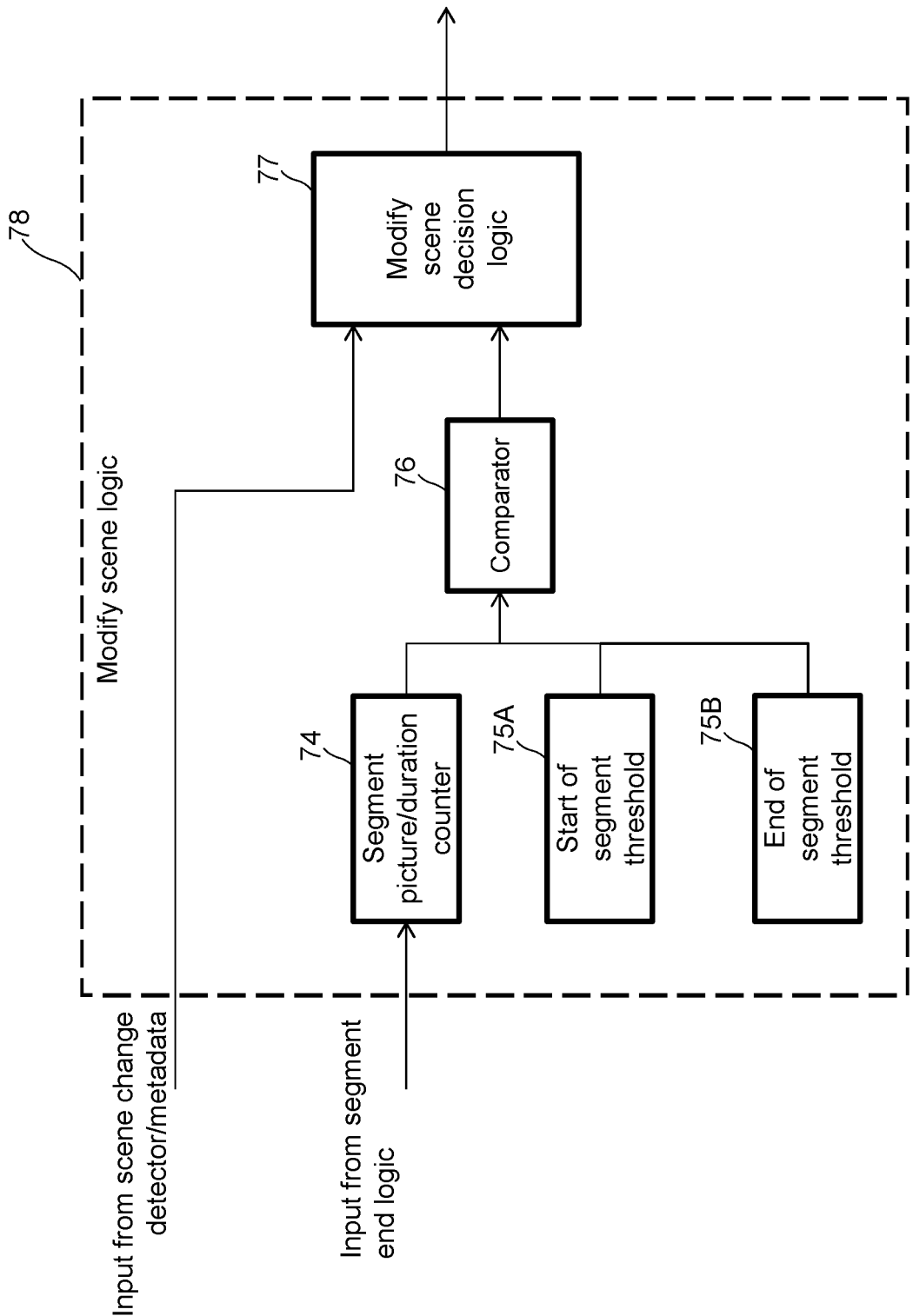
FIG. 9 shows more detail of the apparatus of FIG. 8.

FIG. 9 shows an example of how the modify scene logic 78 of FIG. 8 can be implemented. Logic 78 comprises a segment picture/duration counter 74 which maintains a count of pictures in a segment indicative of a duration of the current segment. The counter 74 can be periodically reset by a signal received from the segment boundary block 79. At least one threshold value is also stored. There can be a single threshold, or separate thresholds for a scene change at an end of a segment and at a start of a segment. A comparator 76 compares the value of counter 74 with the threshold value(s) 75 and provides an output to modify scene decision logic 77. For example, when the counter 74 outputs a value which is less than the start of segment threshold 75A, comparator 76 can output a signal indicating that the scene can be modified. When the counter 74 outputs a value which is greater than the start of segment threshold 75A and less than the end of segment threshold 75B, comparator 76 can output a signal indicating that the scene cannot be modified. When the counter 74 outputs a value which is greater than end of segment threshold 75B, comparator 76 can output a signal indicating that the scene can be modified. When logic 77 receives an input from comparator 76 indicating that the scene can be modified, and an input from the scene change detector (and/or metadata) indicating that a scene change has occurred, logic 78 can provide an output indicating that the scene should be modified. As described above, a decision to modify a scene may be based on other factors. Logic 77 may receive one or more other inputs to allow the decision to modify a scene to be based on another factor, or other factors.

Figure 10:
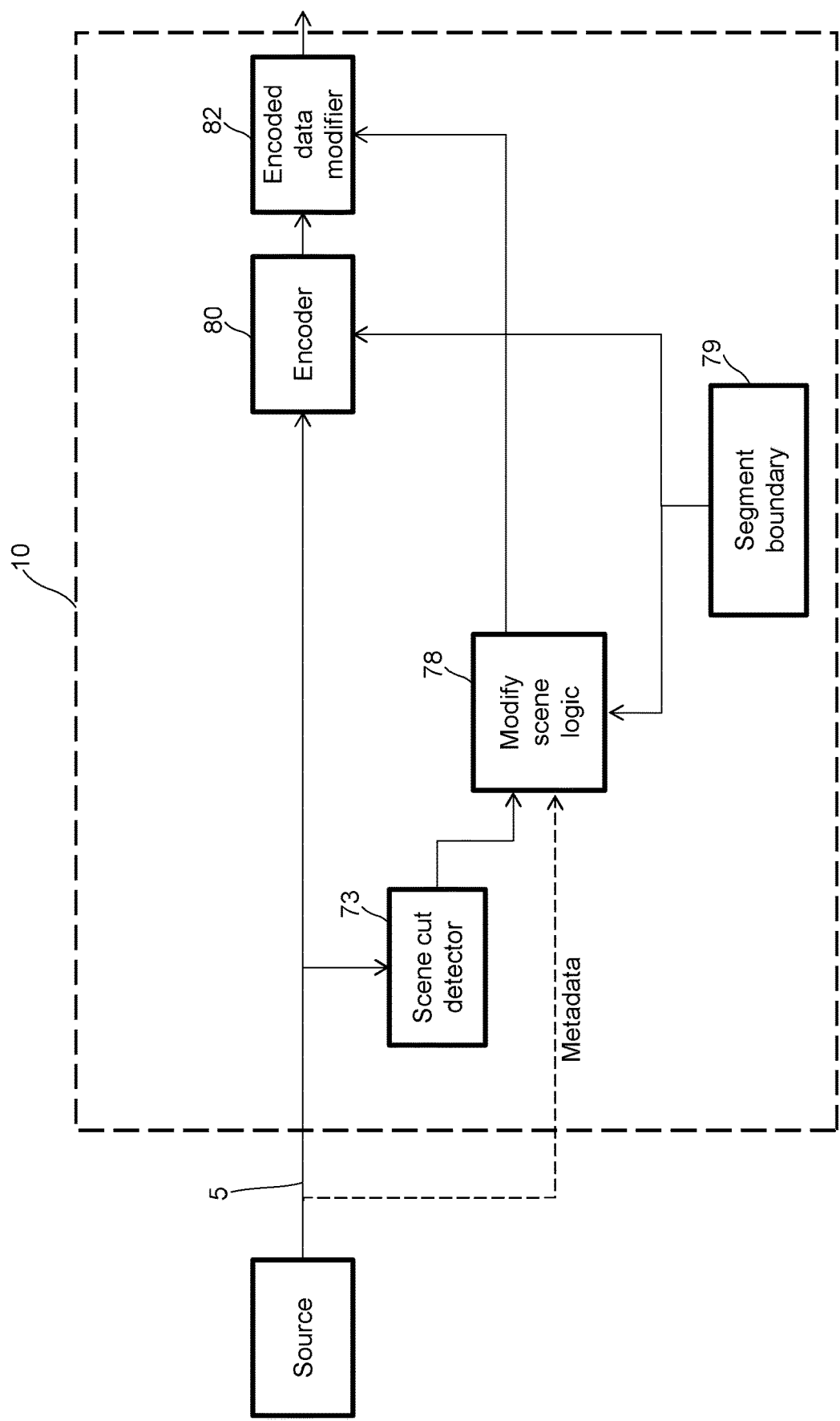
FIG. 10 schematically shows an example of apparatus for implementing the processing, where modification occurs after the encoder.

FIG. 10 shows a modified version of FIG. 8 for the case where data is switched at the output of the encoder 80. Operation of FIG. 10 is similar to FIGS. 8 and 9, except that data is modified at a block 82 downstream of the encoder 80.

Figure 11:
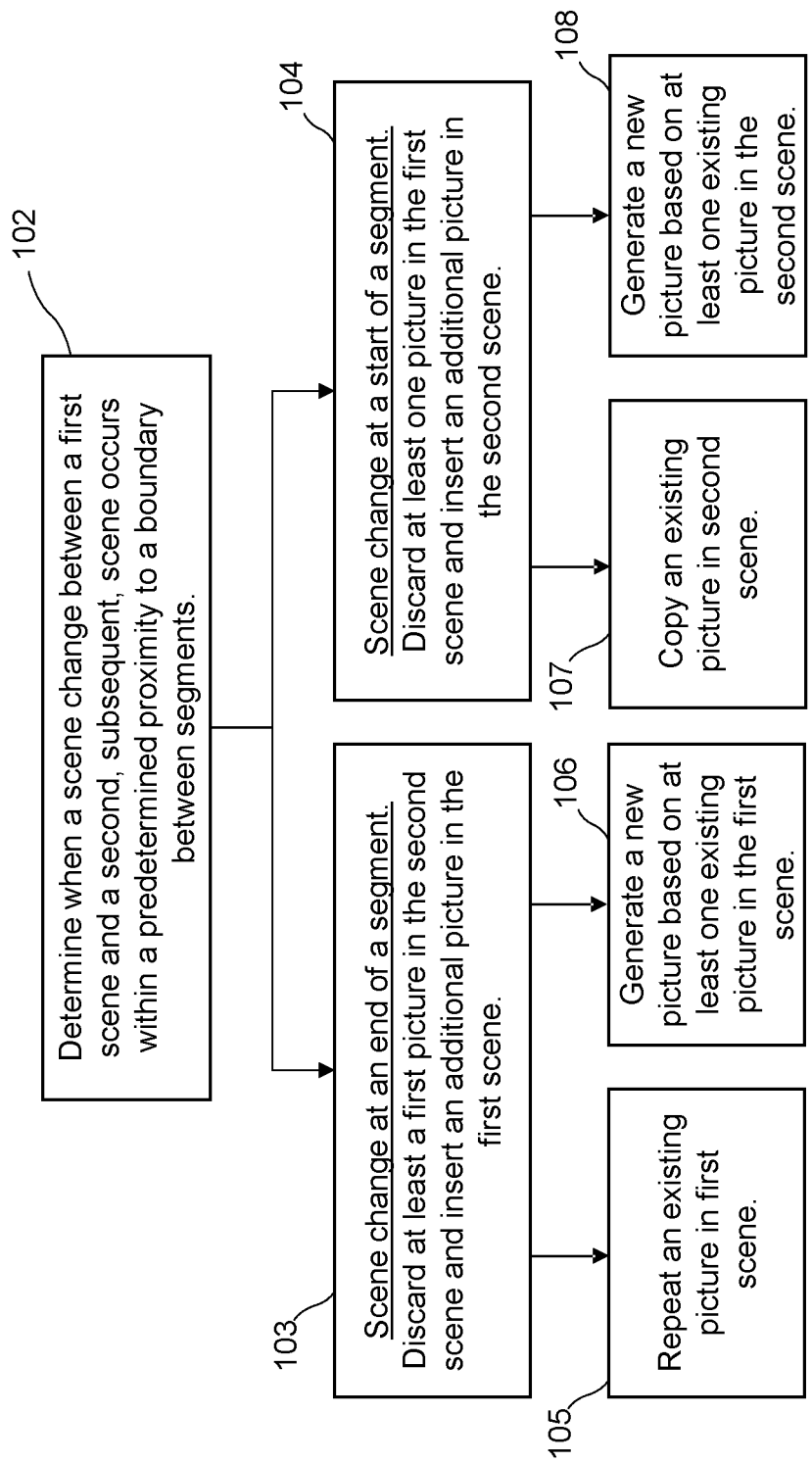
FIG. 11 shows a method of processing media content.

FIG. 11 shows a method of processing media content comprising video. The video comprises a sequence of scenes comprising pictures. The media content comprises segments. The method comprises a step 102 of determining when a scene change between a first scene and a second, subsequent, scene occurs within a predetermined proximity to a boundary between segments. When a scene change occurs within a predetermined proximity of an end of a segment, the method can proceed to step 103. Step 103 comprises discarding at least a first picture in the second scene and inserting an additional picture in the first scene. When a scene change occurs within a predetermined proximity of a start of a segment, the method can proceed to step 104. Step 104 comprises discarding at least one picture in the first scene and inserting an additional picture in the second scene. Further detail of step 103 is shown in steps 105 and 106. Step 105 comprises repeating (105) an existing picture in the first scene. Step 106 comprises generating (106) a new picture based on at least one existing picture in the first scene. Further detail of step 104 is shown in steps 107 and 108. Step 107 comprises copying an existing picture in the second scene. Step 108 comprises generating a new picture based on at least one existing picture in the second scene. Step 103 can discard more than one picture in the second scene and insert more than one additional picture in the first scene. Similarly, step 104 can discard more than one picture in the first scene and insert more than one additional picture in the second scene.

Referring again to FIG. 1, the system may distribute content to a device 40 using a unicast connection between the server 30 and the device 40. The server can select an ABR segment from a representation appropriate to network conditions, and deliver that ABR segment to the device 40. In an alternative scheme, the server may simultaneously transmit multiple representations. Each representation is transmitted as a multicast to devices. An individual device can join a multicast of whichever representation is required. During the course of delivery, the device can select between representations by leaving a multicast of one representation and joining a multicast of another representation.

Figure 12:
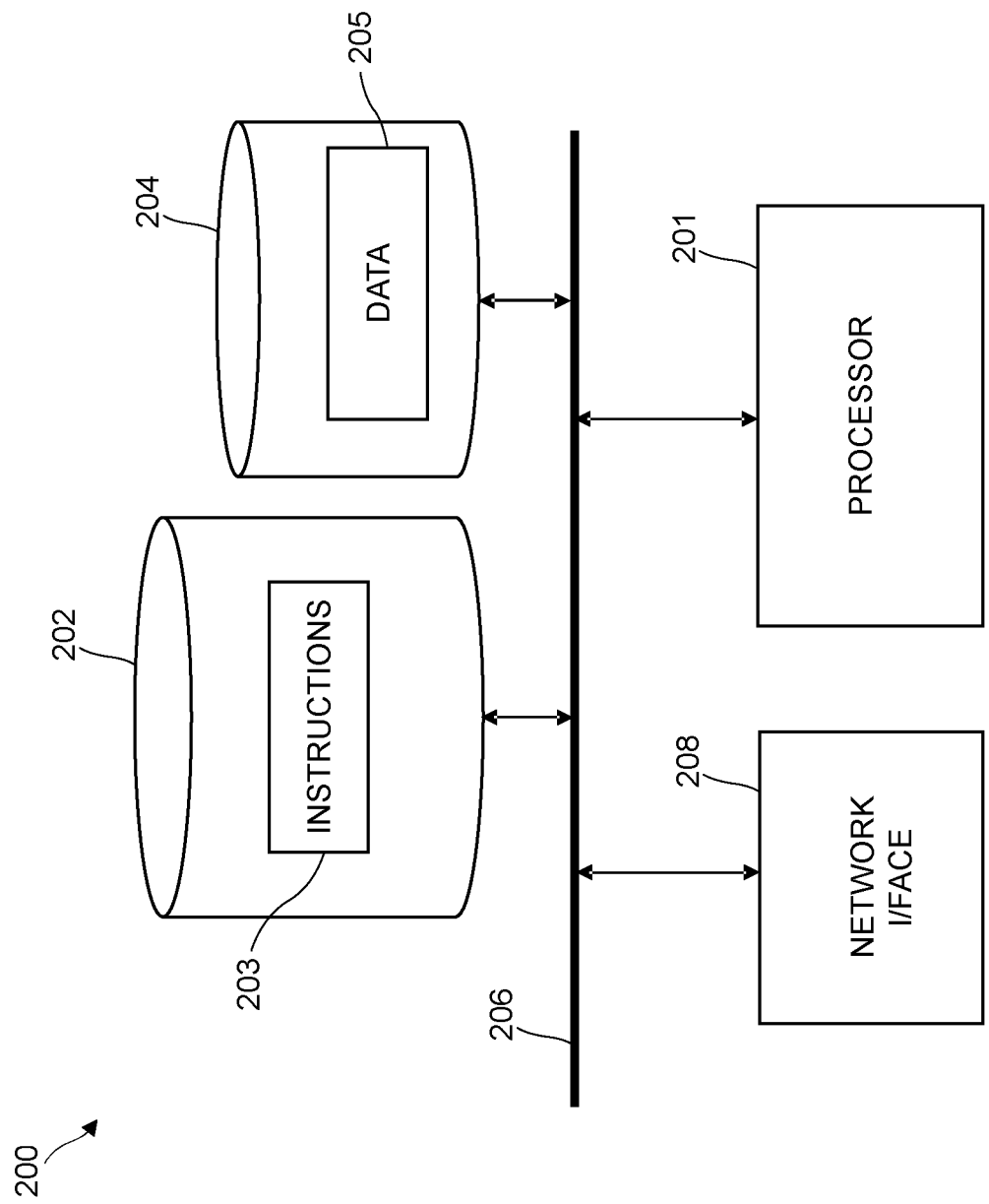
FIG. 12 shows apparatus for a computer-based implementation.

FIG. 12 shows an exemplary processing apparatus 200 which may be implemented as any form of a computing and/or electronic device, and in which embodiments of the system and methods described above may be implemented. Processing apparatus 200 can be provided as part of the encoder/transcoder 10, at a position which is upstream of the encoder/transcoder 10, or the functions can be distributed between positions which are upstream and downstream of the encoder/transcoder 10. Processing apparatus may modify media content as shown in FIGS. 3, 5, 6 and 7 or may implement the method shown in FIG. 11. Processing apparatus 200 comprises one or more processors 201 which may be microprocessors, controllers or any other suitable type of processors for executing instructions to control the operation of the device. The processor 201 is connected to other components of the device via one or more buses 206. Processor-executable instructions 203 may be provided using any computer-readable media, such as memory 202. The processor-executable instructions 203 can comprise instructions for implementing the functionality of the described methods. The memory 202 is of any suitable type such as read-only memory (ROM), random access memory (RAM), a storage device of any type such as a magnetic or optical storage device. Additional memory 204 can be provided to store data 205 used by the processor 201. The processing apparatus 200 comprises one or more network interfaces 208 for interfacing with other network entities.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of processing media content comprising at least one video, said at least one video comprising a sequence of scenes comprising pictures, the method comprising:
    determining whether a scene change from a first scene to a second scene subsequent to the first scene occurs within a predetermined proximity to a boundary between segments, each segment representing a portion of the media content of a fixed duration; and
    performing at least one of:
        when the scene change occurs within a predetermined proximity of an end of a segment, discarding in said segment at least a first picture in the second scene and inserting in said segment an additional picture in the first scene; and
        when the scene change occurs within a predetermined proximity of a start of a segment, discarding in said segment at least one picture in the first scene and inserting in said segment an additional picture in the second scene, wherein
    the step of inserting in said segment the additional picture in the first scene comprises generating a new picture based on at least one existing picture in the first scene,
    the first scene comprises a pair of interlaced fields comprising a first interlaced field and a second interlaced field,
    the step of inserting in said segment the additional picture in the first scene comprises inserting an additional pair of interlaced fields comprising an additional first interlaced field and an additional second interlaced field, and
    the additional first interlaced field is interpolated based on the first interlaced field and the second interlaced field in the first scene and the additional second interlaced field is a repeat of the second interlaced field.

2. The method according to claim 1, wherein the step of inserting in said segment the additional picture in the first scene comprises repeating an existing picture in the first scene.

3. The method according to claim 1, wherein the step of inserting in said segment the additional picture in the second scene comprises copying an existing picture in the second scene.

4. The method according to claim 1, wherein the step of inserting in said segment the additional picture in the second scene comprises generating a new picture based on at least one existing picture in the second scene.

5. The method according to claim 4, wherein
    the second scene comprises a pair of interlaced fields comprising a first interlaced field and a second interlaced field,
    the step of inserting in said segment the additional picture in the second scene comprises inserting an additional pair of interlaced fields comprising an additional first interlaced field and an additional second interlaced field, and
    the additional first interlaced field is a repeat of the first interlaced field, and the additional second interlaced field is interpolated based on the first interlaced field and the second interlaced field in the second scene.

6. The method according to claim 1, wherein the segments have the same duration.

7. The method according to claim 1, wherein the segments are adaptive bit rate segments.

8. The method according to claim 1, further comprising encoding or transcoding the media content at a plurality of different bit rates to form a plurality of different bit rate representations of the media content.

9. An apparatus for processing media content comprising at least one video, said at least one video comprising a sequence of scenes comprising pictures, the apparatus comprising a processor and a memory, said memory containing instructions executable by said processor whereby said apparatus is operative to:
    determine whether a scene change from a first scene to a second scene subsequent to the first scene occurs within a predetermined proximity to a boundary between segments, each segment representing a portion of the media content of a fixed duration; and
    perform at least one of:
        when the scene change occurs within a predetermined proximity of an end of a segment, discard from said segment at least a first picture in the second scene and insert into said segment an additional picture in the first scene; and
        when the scene change occurs within a predetermined proximity of a start of a segment, discard from said segment at least one picture in the first scene and insert into said segment an additional picture in the second scene, wherein
    the step of inserting in said segment the additional. picture in the first scene comprises generating a new picture based on at least one existing picture in the first scene, the first scene comprises a pair of interlaced fields comprising a first interlaced field and a second interlaced field, the step of inserting in said segment the additional picture in the first scene comprises inserting an additional pair of interlaced fields comprising an additional first interlaced field and an additional second interlaced field, and the additional first interlaced field is interpolated based on the first interlaced field and the second interlaced field in the first scene, and the additional second interlaced field is a repeat of the second interlaced field.

10. The apparatus according to claim 9, wherein said apparatus is operative to insert into said segment the additional picture in the first scene by repeating an existing picture in the first scene.

11. The apparatus according to claim 9, wherein said apparatus is operative to insert into said segment the additional picture in the second scene by copying an existing picture in the second scene.

12. The apparatus according to claim 9, wherein said apparatus is operative to insert into said segment the additional picture in the second scene by generating a new picture based on at least one existing picture in the second scene.

13. The apparatus according to claim 9, wherein the segments have the same duration.

14. The apparatus according to claim 9, wherein the segments are adaptive bit rate segments.

15. A computer program product comprising a non-transitory machine-readable medium carrying instructions which, when executed by a processor, cause the processor to perform the method of claim 1.

* * * * *